United States Patent
Cassani

(10) Patent No.: US 8,631,644 B2
(45) Date of Patent: Jan. 21, 2014

(54) METHOD FOR OPERATING POST INJECTIONS OF FUEL IN AN INTERNAL COMBUSTION ENGINE

(75) Inventor: Stefano Cassani, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 453 days.

(21) Appl. No.: 13/006,180

(22) Filed: Jan. 13, 2011

(65) Prior Publication Data

US 2011/0173952 A1 Jul. 21, 2011

(30) Foreign Application Priority Data

Jan. 15, 2010 (GB) .................................. 1000635.1

(51) Int. Cl.
*F01N 3/00* (2006.01)
(52) U.S. Cl.
USPC .............................................. 60/285; 60/286
(58) Field of Classification Search
USPC .......................................... 60/285, 274–324
See application file for complete search history.

(56) References Cited

U.S. PATENT DOCUMENTS

| | | | |
|---|---|---|---|
| 7,210,286 B2 * | 5/2007 | Sun et al. ........................ 60/295 |
| 2009/0293453 A1 | 12/2009 | Sujan | |

FOREIGN PATENT DOCUMENTS

| | | |
|---|---|---|
| EP | 1722088 A2 | 11/2006 |
| WO | 2004081360 A1 | 9/2004 |
| WO | 2009146452 A2 | 12/2009 |

OTHER PUBLICATIONS

Great Britain Search Report dated Apr. 28, 2010, issued in Application No. 1000635.1.

* cited by examiner

*Primary Examiner* — Thomas Denion
*Assistant Examiner* — Kelsey Stanek
(74) *Attorney, Agent, or Firm* — Ingrassia Fisher & Lorenz, P.C.

(57) ABSTRACT

A method is provided for operating an engine. The engine is configured to post inject a quantity of fuel into a combustion chamber and includes, but is not limited to a Diesel Oxidation Catalyst (DOC) that has an inlet and an outlet. The method includes, but is not limited to determining an open loop post injection quantity $q_{post\_OL}$ of fuel as a function of a target temperature $T_{Otarget}$ for the Diesel Oxidation Catalyst (DOC) outlet, the step of determining the current temperature $T_O$ at the Diesel Oxidation Catalyst (DOC) outlet and the step of determining, for the temperature $T_O$, a closed loop post injection quantity $q_{post\_CL}$ of fuel needed for correcting the open loop post injection quantity $q_{post\_OL}$ for determining a correct post injection fuel quantity $q_{post}$ needed to match the desired DOC heat release related to the target temperature $T_{Otarget}$ when operating the engine system.

16 Claims, 2 Drawing Sheets

METHOD FOR OPERATING POST INJECTIONS OF FUEL IN AN INTERNAL COMBUSTION ENGINE

CROSS-REFERENCE TO RELATED APPLICATION

This application claims priority to British Patent Application No. 1000635.1, filed Jan. 15, 2010, which is incorporated herein by reference in its entirety.

TECHNICAL FIELD

The technical field relates to a method for operating post injections of fuel in an internal combustion engine system, which may be used to perform Diesel Particulate Filter regeneration.

BACKGROUND

It is known that the Diesel Particulate Filter, which is also referred as DPF in the present description, is a device located in the exhaust line of diesel engines; such device is designed to trap the soot in order to clean the exhaust gas and in order to comply with specific regulation emission limits.

Electronics systems managing the engine are capable to recognize when the filter is full; at this time they command a so called DPF regeneration process: this is, in principle, a process to empty out the filter based on soot auto combustion inside the trap itself DPF regeneration is achieved by exhaust gas temperature increase up to 600° C. for short time (e.g., around 10 minutes). The regeneration process frequency is generally linked to DPF loading time or mileage and can vary depending on several factors, especially the driving style, and typically occurs in a range of one event every 200/600 km.

The main means to achieve the needed temperature for regenerating the DPF are the so called late fuel injections that are activated during the regeneration process. In fact it is known that, in order to improve emissions and combustion noise in diesel engines, a multiple fuel injection pattern can be used, such pattern being substantially composed of a split of the requested fuel quantity into several injections. This multi-injection pattern comprises also, after the Top Dead Center (TDC) of the piston, some late injections. The first late injection is typically called After-Injection and it is partially participating to in-chamber combustion; the second late injection is typically called Post-Injection and, being very far from the TDC, it represents a pure contribution to HC exhaust content (meaning it is not burning into the combustion chamber).

Agents present into exhaust gases, mainly CO and HC, are oxidized into the diesel oxidation catalyst, which are also referred as DOC in the present description, present along the exhaust pipe typically upstream the DPF. Those chemical reactions are exothermic reactions:

$CO+O_2 \rightarrow CO_2$ $\Delta T_{exhaust} \approx 1°$ C./100 ppm [CO]

$HC+O_2 \rightarrow CO_2+H_2O$ $\Delta T_{exhaust} \approx 2°$ C./100 ppm [HC]

By increasing HC contents in the exhaust the DOC becomes then a heat generator. This principle is used to realize temperature increase to regenerate the DPF. HC content in the exhaust gases is controlled by means of late fuel injections. After-Injection quantity is typically controlled in open-loop: this means that specific calibration maps are present in the control system to decide the amount of fuel to be injected, on the base of engine working conditions (i.e., engine load and engine crankshaft speed). Post-Injection quantity is typically evaluated as a base open-loop contribution, which is also referred as OL in the present description, plus a closed loop contribution. The closed loop control, which is also referred as CLC in the present description, is based on DPF inlet temperature feedback.

A current method, described in WO 2004 081 360, to control the Post-Injection (OL+CLC), in particular the CLC contribution to Post-Injection quantity calculation, has limited performances and gives limited benefits especially against: temperature oscillation due to driving style variations, system drifts (i.e., fuel injectors drifts), DOC ageing that is correlated to reduced oxidation efficiency. This latter is one of the biggest weak points of the above method, since a DPF system is a 'for life' system and needs to be effective without any service intervention during the entire vehicle life.

Additionally such method involves a huge number of calibration parameters so to adapt controller performances to several possible conditions to be taken into account. This because no physical modeling of the HC oxidation is present in this control structure to decide the amount of fuel to be injected for Post-Injection. This amount of calibration parameters causes of course a big effort in calibration development, especially in terms time and resources and has also a cost impact on engine control unit, for example on RAM memory usage.

In view of the foregoing, at least one object of an embodiment of the invention is to provide a method for the determination of a post injection quantity of fuel in an internal combustion engine system, without using complex devices and by taking advantage from the computational capabilities of the Electronic Control Unit (ECU) of the vehicle. An object of a further embodiment of the invention is to provide a method to perform an optimal Diesel Particulate Filter regeneration. Another object is to meet these goals by means of a simple, rational and inexpensive solution. In addition, other objects, desirable features and characteristics will become apparent from the subsequent detailed description, and the appended claims, taken in conjunction with the accompanying drawings and this background.

SUMMARY

An embodiment of the invention provides for a method of operating an engine. The engine is configured to post inject a quantity of fuel into a combustion chamber, the engine comprising a Diesel Oxidation Catalyst (DOC) that has an inlet and an outlet. The method comprising the steps determining an open loop post injection quantity $q_{post\_OL}$ of fuel as a function of a target temperature $T_{Otarget}$ for the Diesel Oxidation Catalyst (DOC) outlet, the step of determining the current temperature $T_O$ at the Diesel Oxidation Catalyst (DOC) outlet and the step of determining, for the temperature $T_O$, a closed loop post injection quantity $q_{post\_CL}$ of fuel needed for correcting the open loop post injection quantity $q_{post\_OL}$ for determining a correct post injection fuel quantity $q_{post}$ needed to match the desired DOC heat release related to the target temperature $T_{Otarget}$ when operating the engine system. This embodiment has at least the advantage of determining a correct post injection quantity $q_{post}$ into the engine system when operating the engine system.

Another embodiment provides for the phase of determining a closed loop post injection quantity $q_{post\_CL}$ by setting of a target difference $(dQ_o/dt - dQ_i/dt)_{target}$ between outlet heat power $dQ_o/dt$ and inlet heat power $dQ_i/dt$ for said DOC as a function of the temperature $T_i$ of the DOC and of exhaust gas mass flow $dm/dt$ at the inlet and outlet of said DOC. This embodiment contributes to the calculations needed to achieve the determination of a correct post injection quantity of fuel $q_{post}$ when operating the engine system.

Another embodiment provides for determining a closed loop post injection quantity $q_{post\_CL}$ by means of the evaluation of the current difference $(dQ_o/dt-dQ_i/dt)_{current}$ between outlet heat power $dQ_o/dt$ and inlet heat power $dQ_i/dt$ for said DOC as a function of inlet temperature $T_i$ and of outlet temperature $T_O$ of the DOC and of exhaust gas mass flow $dm/dt$ at the inlet and outlet of the DOC. This embodiment contributes by means of suitable measurements and calculations of the relevant current values of the physical quantities involved when operating the engine system.

Another embodiment provides for a further step where the difference between $(dQ_o/dt-dQ_i/dt)_{target}$ and $(dQ_o/dt-dQ_i/dt)_{current}$ is used to set a tracking error suitable to be used to determine the closed loop post injection quantity $q_{post\_CL}$ of fuel. This embodiment has the advantage of setting a tracking error suitable for the control of the operation of the engine system.

Another embodiment provides for a further step where $q_{post\_OL}$ and $q_{post\_CL}$ are determined, in a Steady State (SS) condition of the DOC, taking into account at least the difference between outlet heat power $dQ_o/dt$ and inlet heat power $dQ_i/dt$ for the DOC, the efficiency $\eta_{pipe}$ of the exhaust pipe between engine outlet and DOC inlet, the DOC specific efficiency $\eta_{cat}$, the heating value H of the fuel, the quantity of fuel $q_{after}$ of the after injection and the efficiency $\eta_{aft}$ of the after injection. This embodiment has the advantage of employing the correct Steady State (SS) condition parameters for the DOC for the control of the operation of the engine system in such condition.

Another embodiment provides for a further step where $q_{post\_OL}$ and $q_{post\_CL}$ are determined, in a Transient State (TS) condition of the DOC, taking into account also at least the amount of power $dQ_{cat}/dt$ consumed by the DOC itself. This embodiment has the advantage of employing the correct Transient State (TS) condition parameters for the DOC for the control of the operation of the engine system in such condition.

Another embodiment provides for a further step where $q_{post\_OL}$ and $q_{post\_CL}$ are determined, in a Transient State (TS) condition of the DOC and taking into account the aging of the DOC, taking into account also at least the efficiency $\eta_{cat\_aged}$ of the aged DOC. This embodiment has the advantage of employing the correct Transient State (TS) condition parameters and any suitable aging parameters for the DOC for the control of the operation of the engine system in such condition.

Another embodiment provides for a further step where $T_{Otarget}$ for DOC outlet is set as a variable depending on regeneration (RGN) time elapsed. This embodiment has the advantage of setting a $T_{Otarget}$ dynamically as a function of the actual operation of the engine system.

Another embodiment provides for a method for operating a regeneration cycle of a Diesel Particulate Filter (DPF) in an internal combustion engine system, the method comprising at least the steps of determining an open loop post injection quantity $q_{post\_OL}$ of fuel as a function of a target temperature $T_{Otarget}$ for the Diesel Oxidation Catalyst (DOC) outlet, the step of determining the current temperature $T_O$ at the Diesel Oxidation Catalyst (DOC) outlet and determining, for the temperature $T_O$, a closed loop post injection quantity $q_{post\_CL}$ of fuel for correcting the open loop post injection quantity $q_{post\_OL}$ for determining a post injection fuel quantity $q_{post}$ needed to match the desired DOC heat release related to the target temperature $T_{Otarget}$ when operating the engine system and the step of injecting the post injection quantity $q_{post}$ into the engine system. This embodiment has the advantage of injecting a correct post injection quantity $q_{post}$ into the engine system when operating the engine system.

The method according can be realized in the form of a computer program comprising a program-code to carry out all the steps of the method and in the form of a computer program product comprising means for executing the computer program. The computer program product comprises, according to a preferred embodiment, a control apparatus for an IC engine, for example the ECU of the engine, in which the program is stored so that the control apparatus defines such embodiment or embodiments in the same way as the method. In this case, when the control apparatus executes the computer program all the steps of the method according to the embodiments are carried out.

The method according can be also realized in the form of an electromagnetic signal. The signal being modulated to carry a sequence of data bits which represent a computer program to carry out all the steps of the method. An internal combustion engine is also provided that is specially arranged for carrying out the method claimed.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
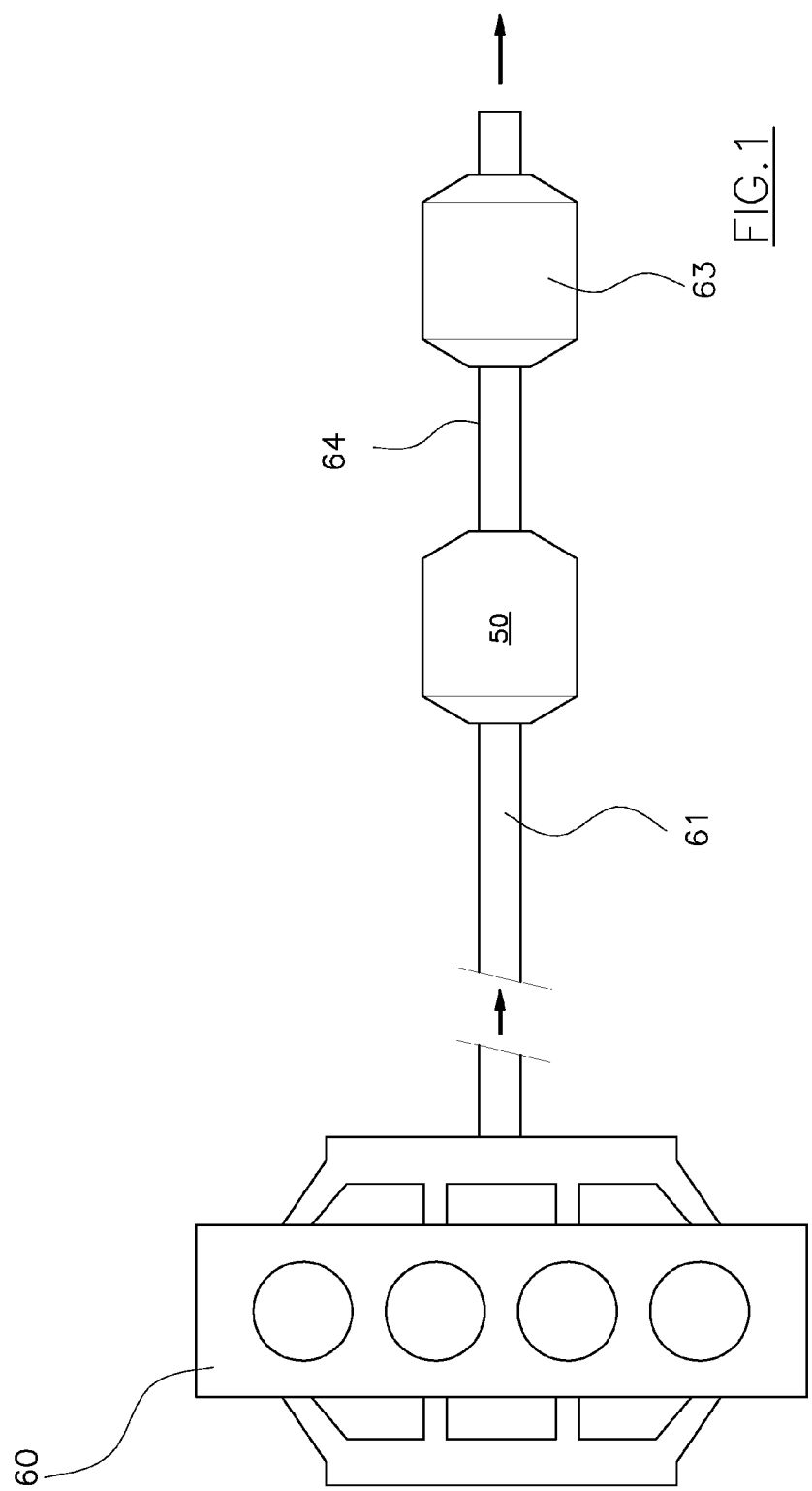
FIG. 1 is a schematic diagram of the main components of the engine system that allow actuation of the method.
Figure 2:
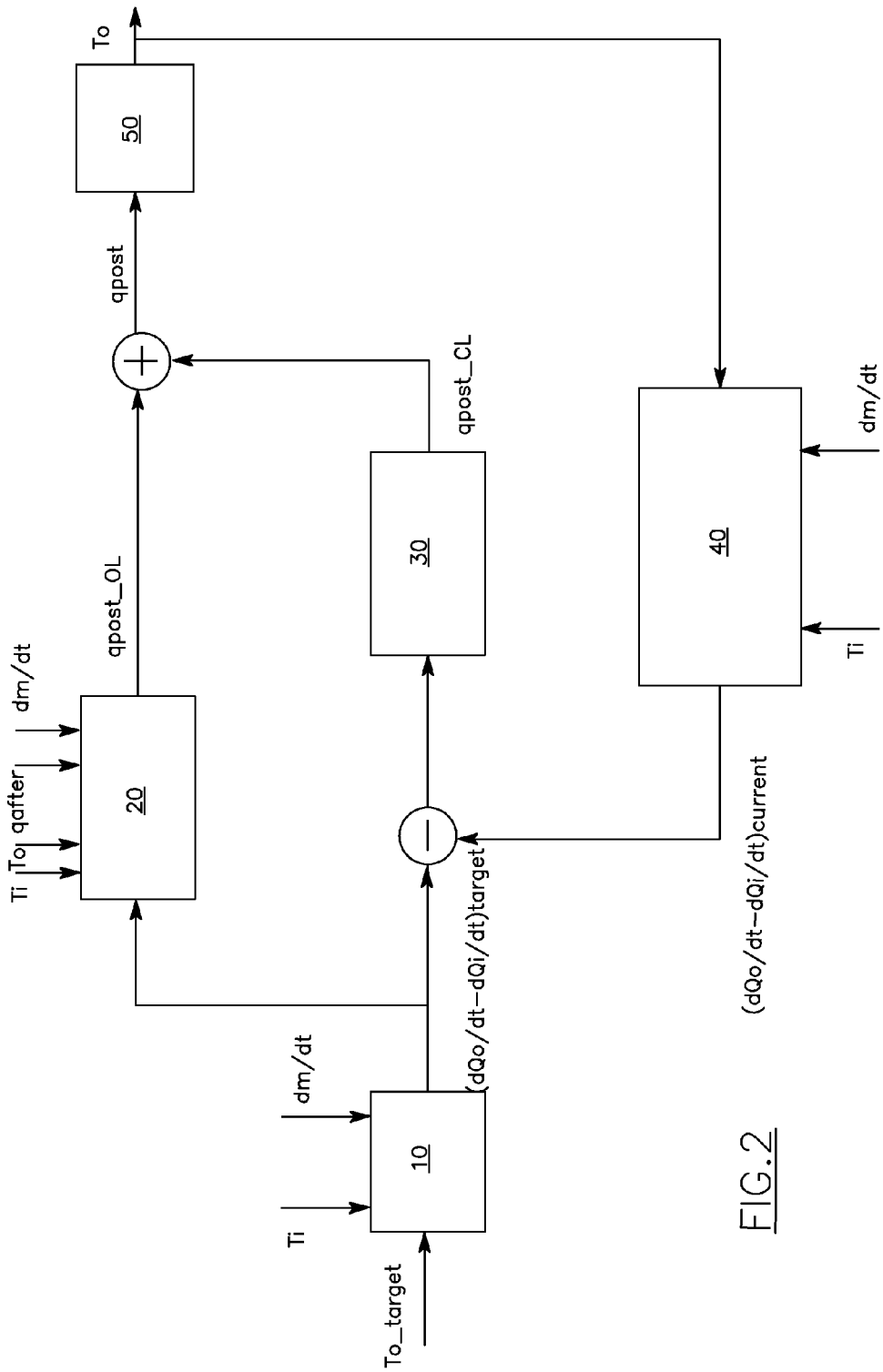
FIG. 2 is a schematic diagram of a Closed Loop Control used in the actuation of the method.

In FIG. 1 an engine 60 is schematically represented, along with a Diesel Oxidation Catalyst (DOC) 50, the DOC having an inlet 61 and an outlet 64. The outlet 64 of the DOC is connected downstream to Diesel Particulate Filter 63 of which the method described is used to operate regeneration cycles.

In order to implement the method of the embodiments, a model of the Diesel Oxidation Catalyst (DOC), and specifically of its thermal behavior in various conditions of use, has been created. By increasing HC in the exhaust the DOC becomes a heat generator. This principle is used to realize a temperature increase to regenerate the DPF 63. HC content in the exhaust gases is controlled by means of post fuel injections and, in the embodiment described, by a correct quantity of fuel for the injection.

The model will be explained starting from a first case which is the Steady State (SS) for the DOC in which the following equations hold:

$$dQ_o/dt = dQ_i/dt + dQ_{oxy}/dt \quad (1)$$

where:

$$dQ_i/dt = dm/dt * c_p * T_i \quad (2)$$

$$dQ_o/dt = dm/dt * c_p * T_o \quad (3)$$

$$dQ_{oxy}/dt = q_{after} * (1-\eta_{aft}) * (1-\eta_{pipe}) * \eta_{cat} * H + q_{post} * (1-\eta_{pipe}) * \eta_{cat} * H \quad (4)$$

According to this model $dQ_i/dt$ and $dQ_o/dt$ represents respectively DOC inlet 61 and DOC outlet 64 heat power and are expressed in terms of exhaust gas mass flow $dm/dt$, exhaust gas mass specific power coefficient $c_p$, and exhaust gas temperatures $T_i$ and $T_o$ of inlet and outlet respectively.

At the same time $dQ_{oxy}/dt$ represents DOC internal heat power due to HC oxidation and is expressed in terms of after and post injected fuel quantities $q_{after}$ and $q_{post}$ and fuel specific power coefficient H. It is to be noted that after injection quantity $q_{after}$ needs to be reduced to consider only the part (HC) flowing through the exhaust, or in other words, the part not burned into combustion chamber. In this case an efficiency factor $\eta_{aft}$ is needed and is part of the discussed model. Also, both after and post injections $q_{after}$ and $q_{post}$ need to be reduced to consider that some HCs are burned along the pipe, this latter element being quite hot, therefore $\eta_{pipe}$ represents the efficiency of the exhaust pipe between engine 60 outlet and DOC inlet 61. Finally, both after and post injections are then converted into heat with the DOC specific efficiency $\eta_{cat}$ as expressed in Eq. (4) above.

The model can be extended in order to represent a second case, namely the Transient State (TS), in which the following equation holds:

$$dQ_o/dt = dQ_i/dt + dQ_{oxy}/dt - dQ_{cat}/dt \quad (5)$$

In Eq. (5), the added term $dQ_{cat}/dt$ represent the amount (with sign) of power consumed by the DOC itself, that is so subtracted to the exhaust flow because of DOC thermal inertia, to let the system achieve a new Stable State (SS) condition. SS equation is a subset of TS equation. TS equation can so be considered as a general equation to model the Diesel Oxidation Catalyst (DOC) 50.

The quantity $Q_{cat}$ can be determined by experimental testing as being dependent on exhaust flow $dm/dt$; this relationship is then stored into the engine control unit (ECU). Transient behavior of the DOC can be simulated by means of first order low pass filter, which is the typical behavior for thermal inertia, applied to $Q_{cat}$ with parameters recognized through experimental testing and stored into engine control. $dQ_{cat}/dt$ is then evaluated as a difference between $Q_{cat}$ and filtered $Q_{cat}$ Eq. (6).

As for the determination of the various terms of the equations comprised in the above model, it is noted the following. Efficiency parameters involved into $dQ_{oxy}/dt$ calculation can be determined with experimental tests and stored as calibration parameters into the engine control unit (ECU) with the above described main dependencies. Exhaust flow $dm/dt$ is evaluated by the engine control unit (ECU), on the base of intake air flow measurement and total fuel mass injected.

$C_p$, namely specific heat, and H, namely heating value, and their dependencies with other physical parameters, are known from literature and can be stored into the engine control unit (ECU). $T_i$ and $T_o$ are measured along the exhaust pipe and input to the engine control unit (ECU), for example by means of suitable sensors or other equivalent methods.

Finally, $q_{after}$ and $q_{post}$ are computed by the engine control unit (ECU) itself. That means that Transient State (TS) balance equation can be completely assessed by the engine control unit (ECU).

The model previously discussed essentially refers to the physic behavior of the Diesel Oxidation Catalyst (DOC) 50 and to its representation in the engine control unit (ECU) of the vehicle. An embodiment of the present invention will now be described in terms of a method for the determination of an optimal post injection quantity by using the physical relationships of the above described model.

A series of calculation steps is therefore performed. Initially, a desired temperature $T_{Otarget}$ for DOC outlet is set. For example the set temperature maybe a constant temperature, such for example 630° C. or other suitable constant temperature value. The set temperature may also be set as a variable depending on various parameters, such as for example on regeneration (RGN) time elapsed. Then, based on $T_{Otarget}$ and on measurements for $T_i$ and $dm/dt$, a target $(dQ_o/dt - dQ_i/dt)_{target}$ for $(dQ_o/dt - dQ_i/dt)$ can be set by using Eq. (2) and (3) such as expressed in block 10.

Based on current measurement for $T_o$, $T_i$, $dm/dt$, $q_{after}$, and by using equations (1), (2), (3) and (4), it is possible calculate an open loop quantity $q_{post\_OL}$ for the post injection (block 20), according for example to the following equation derived from the model explained:

$$q_{post\_OL} = (dQ_o/dt - dQ_i/dt)/[(1-\eta_{pipe})*\eta_{cat}*H)] - q_{after}*(1-\eta_{aft})$$

The above equation refers to a Steady State (SS) condition as it is based onto Eq. (1).

Based on current measurement for $T_o$, $T_i$, $dm/dt$, then current value for $(dQ_o/dt - dQ_i/dt)_{current}$ is evaluated by using Eq. (2) and (3) (block 40). A tracking error can be set based on the difference between target value and current value for $(dQ_o/dt - dQ_i/dt)$. The tracking error is then input to a $q_{post\_CL}$ Closed Loop calculator block 30, which can be for example a standard PID with calibratable parameters, so to evaluate the correction $q_{post\_CL}$ for the post injection quantity using the same equation of the model. This correction will be different from zero if the open loop quantity $q_{post\_OL}$ is not enough to match the desired heat release related to the desired temperature $T_{Otarget}$.

In Steady State (SS) condition and in nominal conditions, namely when all subsystems are working with nominal performances, the open loop quantity would be enough to match the desired target temperature, but apart from this theoretical case, a correction will generally be needed.

In Transient State (TS) condition an additional quantity for $q_{post}$ would be needed at least as indicated by the new term $dQ_{cat}/dt$ present in Eq. (6). Hence, in this case, the needed $q_{post}$ would be:

$$q_{post} = (dQ_o/dt - dQ_i/dt + dQ_{cat}/dt)/[(1-\eta_{pipe})*\eta_{cat}*H)] - q_{after}*(1-\eta_{aft})$$

Additionally, if the system is not in nominal conditions then $q_{post}$ needed would be even different: injection drifts can cause $q_{aft}$ or the injected $q_{post\_OL}$ to be different from expected; DOC ageing results in a different $\eta_{cat}$ from expected. Hence, in this case, the needed $q_{post}$ would be:

$$q_{post} = (dQ_o/dt - dQ_i/dt + dQ_{cat}/dt)/[(1-\eta_{pipe})*\eta_{cat\_aged}*H)] - q_{after\_drifted}*(1-\eta_{aft})$$

In both cases, the difference $(q_{post} - q_{post\_OL})$ needed to match the target temperature $T_{Otarget}$ is provided by the CLC quantity calculation.

As an alternative also Eq. (5) and Eq. (6), can be used to compute $q_{pos\_OL}$ instead of Eq. (1); in this case transient states, in normal condition, namely nominal performances, will be directly compensated by the open loop. The method described has several important advantages and benefits. The method is suited to achieve optimal post injection quantity especially for challenging conditions like: driving style sudden variations, system drifts, (i.e. fuel injectors drifts), and/or DOC ageing (reduced oxidation efficiency).

Moreover the method described allows to optimize temperature stability and results in reduced undershoot/overshoot. Also, with the method regeneration duration results reduced since target temperature is kept constantly. Moreover, DPF thermal stress results are avoided due to reduction of temperature peaks. Last but not least, typical regeneration process drawbacks like increased FC and oil dilution results contained.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method of operating an engine that is configured to post inject a quantity of fuel into a combustion chamber and comprises a Diesel Oxidation Catalyst (DOC) having an inlet and an outlet, comprising:

determining an open loop post injection quantity $q_{post\_OL}$ of fuel as a function of a target temperature $T_{Otarget}$ for said outlet;

determining a current temperature $T_O$ at said outlet;

determining, for said current temperature $T_O$, a closed loop post injection quantity $q_{post\_CL}$ of the fuel needed for correcting said open loop post injection quantity $q_{post\_OL}$, for determining a correct post injection fuel quantity $q_{post}$ needed to match a desired DOC heat release related to the target temperature $T_{Otarget}$; and operating said engine with the correct post injection fuel quantity $q_{post}$;

wherein determining the closed loop post injection quantity $q_{post\_CL}$ provides for the setting of a target difference $(dQ_o/dt - dQ_i/dt)_{target}$ between outlet heat power $dQ_o/dt$ and inlet heat power $dQ_i/dt$ for said Diesel Oxidation Catalyst (DOC) as a function of a temperature $T_i$ of said Diesel Oxidation Catalyst (DOC) and of exhaust gas mass flow dm/dt at the inlet and outlet of said Diesel Oxidation Catalyst (DOC).

2. The method according to claim 1, wherein determining the closed loop post injection quantity $q_{post\_CL}$ provides for evaluation of a current difference $(dQ_o/dt - dQ_i/dt)_{current}$ between outlet heat power $dQ_o/dt$ and inlet heat power $dQ_i/dt$ for said Diesel Oxidation Catalyst (DOC) as a function of inlet temperature $T_i$ and of a temperature of the outlet $T_O$ of said Diesel Oxidation Catalyst (DOC) and of exhaust gas mass flow dm/dt at the inlet and outlet of said Diesel Oxidation Catalyst (DOC).

3. The method according to claim 2, wherein a difference between $(dQ_o/dt - dQ_i/dt)_{target}$ and $(dQ_o/dt - dQ_i/dt)_{current}$ is used to set a tracking error suitable to be used to determine said closed loop post injection quantity $q_{post\_CL}$ of fuel.

4. A method of operating an engine that is configured to post inject a quantity of fuel into a combustion chamber and comprises a Diesel Oxidation Catalyst (DOC) having an inlet and an outlet, comprising:

determining an open loop post injection quantity $q_{post\_OL}$ of fuel as a function of a target temperature $T_{Otarget}$ for said outlet;

determining a current temperature $T_O$ at said outlet;

determining, for said current temperature $T_O$, a closed loop post injection quantity $q_{post\_CL}$ of the fuel needed for correcting said open loop post injection quantity $q_{post\_OL}$ for determining a correct post injection fuel quantity $q_{post}$ needed to match a desired DOC heat release related to the target temperature $T_{Otarget}$; and operating said engine with the correct post infection fuel quantity $q_{post}$;

wherein $q_{post\_OL}$ and $q_{post\_CL}$ are determined, in a Steady State (SS) condition of said Diesel Oxidation Catalyst (DOC), taking into account at least a difference between outlet heat power $dQ_o/dt$ and inlet heat power $dQ_i/dt$ for said Diesel Oxidation Catalyst (DOC), the efficiency $\eta_{pipe}$ of an exhaust pipe between an outlet of the engine and the inlet, a specific efficiency $\eta_{cat}$, a heating value H of the fuel, a quantity of fuel $q_{after}$ of an after injection and the efficiency $\eta_{aft}$ of said after injection.

5. The Method according to claim 4, wherein $q_{post\_OL}$ and $q_{post\_CL}$ are determined, in a Transient State (TS) condition of said Diesel Oxidation Catalyst (DOC), taking into account also at least an amount of power $dQ_{cat}/dt$ consumed by the Diesel Oxidation Catalyst (DOC).

6. The method according to claim 5, wherein $q_{post\_OL}$ and $q_{post\_CL}$ are determined, in the Transient State (TS) condition of said Diesel Oxidation Catalyst (DOC) and taking into account the aging of said Diesel Oxidation Catalyst (DOC), taking into account also at least the efficiency $\eta_{cat\_aged}$ of an aged DOC.

7. A method of operating an engine that is configured to post inject a quantity of fuel into a combustion chamber and comprises a Diesel Oxidation Catalyst (DOC) having an inlet and an outlet, comprising:

determining an open loop post quantity $q_{post\_OL}$ of fuel as a function of a target temperature $T_{Otarget}$ for said outlet;

determining a current temperature $T_O$ at said outlet;

determining, for said current temperature $T_O$, a closed loop post injection quantity $q_{post\_CL}$ of the fuel needed for correcting said open loop post injection quantity $q_{post\_OL}$ for determining a correct post injection fuel quantity $q_{post}$ needed to match a desired DOC heat release related to the target temperature $T_{Otarget}$ and target, operating said engine with the correct post injection fuel quantity $q_{post}$;

wherein $T_{Otarget}$ for DOC outlet is set as a variable depending on regeneration (RGN) time elapsed.

8. An internal combustion engine, comprising a plurality of sensors adapted to measure a plurality of combustion parameters; and an ECU configured to receive the plurality of combustion parameters and configured to:

determine an open loop post injection quantity $q_{post\_OL}$ of fuel as a function of a target temperature $T_{Otarget}$ for said outlet;

determine a current temperature $T_O$ at said outlet;

determine, for said current temperature $T_O$, a closed loop post injection quantity $q_{post\_CL}$ of fuel needed for correcting said open loop post injection quantity $q_{post\_OL}$ for determining a correct post injection fuel quantity $q_{post}$ needed to match a desired Diesel Oxidation Catalyst (DOC) heat release related to the target temperature $T_{Otarget}$; and control said internal combustion engine with the correct post injection fuel quantity $q_{post}$;

wherein determining the closed loop post injection quantity $q_{post\_CL}$ provides for the setting of a target difference $(dQ_o/dt - dQ_i/dt)_{target}$ between outlet heat power $dQ_o/dt$ and inlet heat power $dQ_i/dt$ for a Diesel Oxidation Catalyst (DOC) as a function of a temperature $T_i$ of said Diesel Oxidation Catalyst (DOC) and of exhaust gas mass flow dmdt at the inlet and outlet of said Diesel Oxidation Catalyst (DOC).

9. The internal combustion engine according to claim 8, wherein determining the closed loop post injection quantity $q_{post\_CL}$ provides for evaluation of a current difference $(dQ_o/dt-dQ_i/dt)_{current}$ between outlet heat power $dQ_o/dt$ and inlet heat power $dQ_i/dt$ for said Diesel Oxidation Catalyst (DOC) as a function of inlet temperature $T_i$ and of outlet temperature $T_O$ of said Diesel Oxidation Catalyst (DOC) and of exhaust gas mass flow $dm/dt$ at the inlet and outlet of said Diesel Oxidation Catalyst (DOC).

10. The internal combustion engine according to claim 9, wherein a difference between $(dQ/_o dt-dQ_i/dt)_{target}$ and $(dQ_o/dt-dQ_i/dt)_{current}$ is used to set a tracking error suitable to be used to determine said closed loop post injection quantity $q_{post\_CL}$ of fuel.

11. An internal combustion engine, comprising
a plurality of sensors adapted to measure a plurality of combustion parameters; and
an ECU configured to receive the plurality of combustion parameters and configured to:
  determine an open loop post injection quantity $q_{post\_OL}$ of fuel as a function of a target temperature $T_{Otarget}$ for said outlet;
  determine a current temperature $T_O$ at said outlet;
  determine, for said current temperature $T_O$, a closed loop post injection quantity $q_{post\_CL}$ of fuel needed for correcting said open loop post injection quantity $q_{post\_OL}$ for determining a correct post injection fuel quantity $q_{post}$ needed to match a desired Diesel Oxidation Catalyst (DOC) heat release related to the target temperature $T_{Otarget}$; and
  control said internal combustion engine with the correct post injection fuel quantity $q_{post}$;
  wherein $q_{post\_OL}$ and $q_{post\_CL}$ are determined, in a Steady State (SS) condition of a Diesel Oxidation Catalyst (DOC), taking into account at least a difference between outlet heat power $dQ_o/dt$ and inlet heat power $dQ_i/dt$ for said Diesel Oxidation Catalyst (DOC), the efficiency $\eta_{pipe}$ of an exhaust pipe between engine outlet and DOC inlet, a specific efficiency $\eta_{cat}$, a heating value H of the fuel, a quantity of fuel $q_{after}$ of an after injection and the efficiency $\eta_{aft}$ of said after injection.

12. The internal combustion engine according to claim 11, wherein $q_{post\_OL}$ and $q_{post\_CL}$ are determined, in a Transient State (TS) condition of said Diesel Oxidation Catalyst (DOC), taking into account also at least an amount of power $dQ_{cat}/dt$ consumed by the Diesel Oxidation Catalyst (DOC).

13. The internal combustion engine according to claim 12, wherein $q_{post\_OL}$ and $q_{post\_CL}$ are determined, in the Transient State (TS) condition of said DOC and taking into account the aging of said DOC, taking into account also at least the efficiency $\eta_{cat\_aged}$ of an aged DOC.

14. An internal combustion engine, comprising
a plurality of sensors adapted to measure a plurality of combustion parameters; and
an ECU configured to receive the plurality of combustion parameters and configured to:
  determine an open loop post injection quantity $q_{post\_OL}$ of fuel as a function of a target temperature $T_{Otarget}$ for said outlet;
  determine a current temperature $T_O$ at said outlet;
  determine, for said current temperature $T_O$, a closed loop post injection quantity $q_{post\_CL}$ of fuel needed for correcting said open loop post injection quantity $q_{post\_OL}$ for determining a correct post injection fuel quantity $q_{post}$ needed to match a desired Diesel Oxidation Catalyst (DOC) heat release related to the target temperature $T_{Otarget}$; and
  control said internal combustion engine with the correct post injection fuel quantity $q_{post}$;
  wherein $T_{Otarget}$ for DOC outlet is set as a variable depending on regeneration (RGN) time elapsed.

15. A non-transitory computer readable medium comprising:
a program for operating an engine that is configured to post inject a quantity of fuel into a combustion chamber and comprises a Diesel Oxidation Catalyst (DOC) having an inlet and an outlet, program configured to:
  determine an open loop post injection quantity $q_{post\_OL}$ of fuel as a function of a target temperature $T_{Otarget}$ for said outlet;
  determine a current temperature $T_O$ at said outlet;
  determine, for said current temperature $T_O$, a closed loop post injection quantity $q_{post\_CL}$ of fuel needed for correcting said open loop post injection quantity $q_{post\_OL}$ for determining a correct post injection fuel quantity $q_{post}$ needed to match a desired DOC heat release related to the target temperature $T_{Otarget}$; and
  operate said engine with the correct post injection fuel quantity $q_{post}$;
  wherein determining the closed loop post injection quantity $q_{post\_CL}$ provides for the setting of a target difference $(dQ_o/dt-dQ_i/dt)_{target}$ between outlet heat power $dQ_o/dt$ and inlet heat power $dQ_i/dt$ for said Diesel Oxidation Catalyst (DOC) as a function of a temperature $T_i$ of said Diesel Oxidation Catalyst (DOC) and of exhaust gas mass flow dmdt at the inlet and outlet of said Diesel Oxidation Catalyst (DOC).

16. The non-transitory computer readable medium according to claim 15, wherein determining the closed loop post injection quantity $q_{post\_CL}$ provides for evaluation of a current difference $(dQ_o/dt-dQ_i/dt)_{current}$ between outlet heat power $dQ_o/dt$ and inlet heat power $dQ_i/dt$ for said Diesel Oxidation Catalyst (DOC) as a function of inlet temperature $T_i$ and of outlet temperature $T_O$ of said Diesel Oxidation Catalyst (DOC) and of exhaust gas mass flow $dm/dt$ at the inlet and outlet of said Diesel Oxidation Catalyst (DOC).

* * * * *